United States Patent [19]

Marchand et al.

[11] 3,805,168

[45] Apr. 16, 1974

[54] CELL FOR SEQUENTIAL CIRCUITS AND CIRCUITS MADE WITH SUCH CELLS

[76] Inventors: Jean Marchand, 102 Avenue Georges Clemenceau, Nanterre; Gerard Cottrez, 35 Rue Lamartine, Rueil-Malmaison, both of France

[22] Filed: Feb. 22, 1972

[21] Appl. No.: 229,216

[30] Foreign Application Priority Data

Feb. 22, 1971 France .............................. 71.05942

[52] U.S. Cl. ..............328/70, 307/223 R, 307/289, 307/218

[51] Int. Cl. .................. H03k 17/02, H03k 19/20

[58] Field of Search ....... 307/218, 223, 289; 328/70

[56] References Cited

UNITED STATES PATENTS

| | | | |
|---|---|---|---|
| 3,202,841 | 8/1965 | Kunzke | 307/223 R |
| 3,385,980 | 5/1968 | Geller | 307/289 |
| 3,416,006 | 12/1968 | Peltier | 307/289 X |
| 3,484,700 | 12/1969 | Armstrong | 307/218 X |

*Primary Examiner*—John Zazworsky
*Attorney, Agent, or Firm*—William Anthony Drucker

[57] ABSTRACT

A system for asynchronous automation control, comprising a plurality of phase signal generating circuits interconnected with action signal generating circuits wherein the action signal generating circuits each comprise a first OR gate having an input connected to at least one output of a phase signal generating circuit, a first AND gate having an input connected to the first OR gate output and a further input normally receiving the logical complements of disabling signals, a second OR gate having an input connected to the first AND gate output and a further input for receiving a hand control signal, and a second AND gate having an input connected to the second OR gate output, a further input normally receiving the logical complement of a locking signal, and an output connected to a further input of the first OR gate.

7 Claims, 12 Drawing Figures

Fig. 6
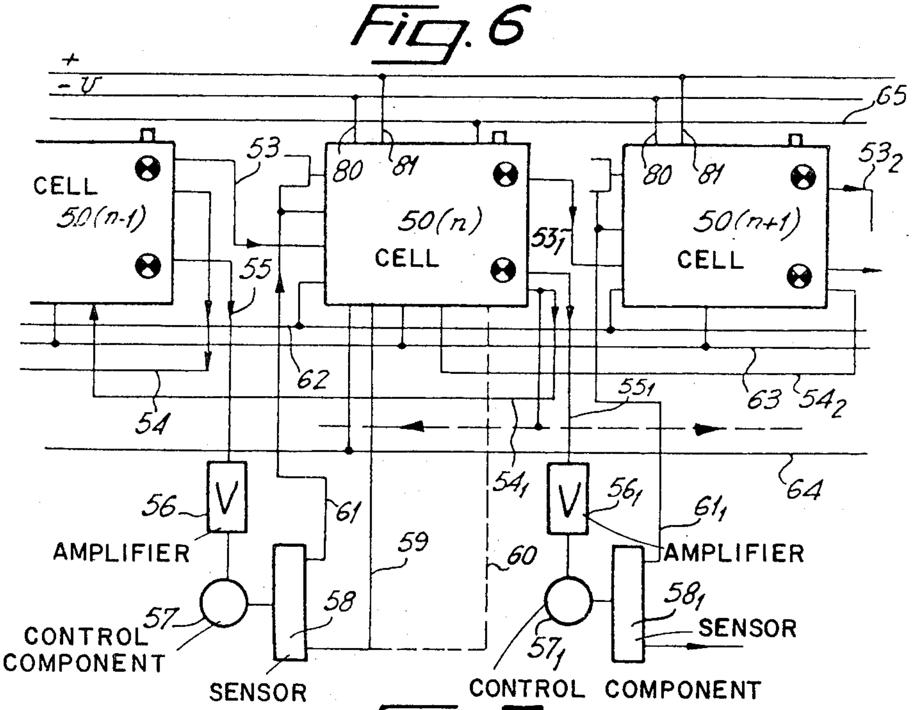
Fig. 7
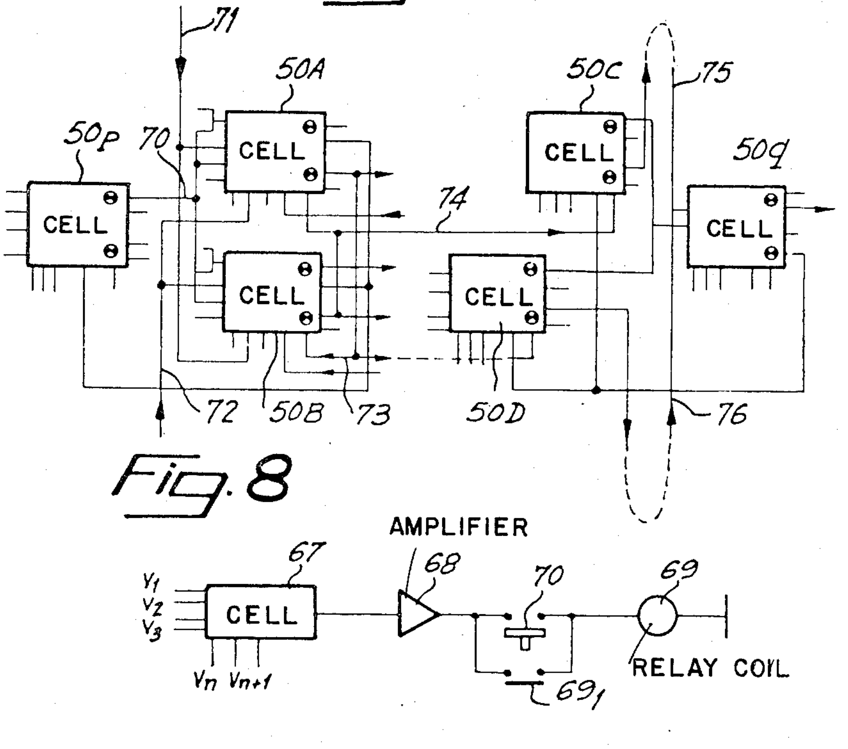
Fig. 8

CELL FOR SEQUENTIAL CIRCUITS AND CIRCUITS MADE WITH SUCH CELLS

This invention relates to a cell designed to be used as a basic element for the formation of any kind of sequential automatic circuit. It relates in particular to cells of this kind, all the same, which, when connected in a chain in order to form a circuit providing some kind of sequential automation, make it possible to obtain a representation diagrammatically showing the flow of the successive sequences, this simply by following the order of succession of said cells.

The invention preferably uses logical connections or the equivalent thereof, wherein each signal is connected to its reverse signal (bearing the same reference but with a stroke above it), the direct and reverse signals alternately occupying two electrical levels conventionally termed Zero and One.

The cells and chains of cells covered by the invention can thus be associated with various known electrical means (end-of-stroke contacts, pushbuttons, various collectors) whose working permutates these two levels to make them into input signals for these cells.

Conversely, at the output, these cells, after suitable amplification, can control, via contactors, all kinds of power or data circuits.

A cell termed "universal" is already known, which, by connecting several of these cells, enables any kind of sequential automatic circuit to be formed.

An already-known approach to the problem consists of listing all the variables forming part of the automation in question and drawing up a table of all possible combinations of these variables, which combinations are then studied one by one in order to eliminate those which are incompatible or impossible in practice. The general table so drawn up makes it possible to establish the synoptic representation known as a "transitions graph" made up of all the stable conditions of the sequential system, any possible change from a previous condition to a later condition being represented by a connecting line joining the symbols representing these conditions on the graph.

It has already been suggested that each symbol representing a condition be replaced by such a universal cell consisting of a flip-flop connected to a delay circuit, the connections between said cells precisely representing said transitions graph, making it possible to go directly from the latter to an electric diagram which, completed by logical circuits, represents the circuit of the sequential automation in question (see the magazine "Automation" — No. 3 — pp. 89 to 97: R. David, "Synthesis of sequential cell networks").

Now, this method and the cell used therein have some disadvantages which make them difficult to put into effect, i.e.:

The method calls for the compiling of a table representing all the possible combinations of variables which come into play. This table, which can be drawn up when three to four variables are involved, becomes impossible to draw up when the $2^n$ combinations corresponding to $n$ variables have to be brought in.

Every possible combination has to be reviewed to see if it must be eliminated or whether it is feasible and then the graph of possible transitions has to be drawn up and retained among all the feasible conditions.

Another disadvantage in using this known cell lies in the fact that the configurations of the final circuit so obtained do not enable the flow of the successive sequences of the system to be followed. The result is that a circuit of this kind can only be used by specialists in the technique in question, and it can only be wired, or in particular repaired, by trained staff. It should be noted, moreover, that with a circuit of this kind, not only is it impossible to follow the flow of the successive sequences but, in case of a breakdown, it is impossible to tell which has the last step carried out in the sequence.

This invention overcomes the aforementioned disadvantages and relates to a cell making it possible, without any other logical elements, to form any kind of sequential automatic circuit. The relative positioning of said cells, all identical, making up said circuit, moreover enables the flow of the successive steps of the sequential system to be followed easily.

Moreover, the use of such cells to form a circuit does not call for an exhaustive preliminary study of the system. On the contrary, a wirer can set up the circuit by following, step by step, a diagrammatic representation, e.g., a table or a flowchart representing the sequential flow of the system, by replacing each of the phases shown on the graphic representation by a cell.

In accordance with the invention, a cell for forming sequential automatic circuits, designed to be mounted in a chain with a plurality of similar cells, comprises an initial connection supplying an initial output signal called a "phase signal" and including logical stages connecting the input signals providing interlocking and the reverse signal of an output signal from the next cell in the chain to a store for this phase signal, and a second connection supplying a second output signal called an "action signal" including logical stages connecting said phase signal and the reverse signals of disabling signals to a store for this action signal.

The output signal from the next cell which is taken into account can be that cell's phase signal, especially when the next cell's action signal is not used for an effective control. Preferably, this output signal from the next cell is the action signal, so that the emission of the phase signal from the previous cell is stopped when, in effect, the next cell has controlled the action for which it is responsible.

The phase signal thus continually gives material form to the step reached in the sequential automatic flow.

Thus, in a cell of this kind, when the input signals are connected, the phase signal, indicating that the corresponding phase of the sequence can be performed, appears providing that the next cell in the chain, which corresponds to the next phase in the sequence, is in fact available.

By means of the store in the first connection, the phase signal is held even if the other signals which caused it to appear have disappeared, and this phase signal can supply the action signal to the corresponding cell, i.e., start the performance of the action performed in the phase and prepare the next phase, providing the disabling signals are absent.

The action signal is then held by the store in the second connection until such a disabling signal appears.

By means of this store, this action signal can be held beyond the duration of the phase signal, to supply (directly or indirectly) an input signal to one or several cells following one another in the chain or, conversely, lock some of these cells.

Thus, a cell can be connected to each phase of a sequential control and, in the sequential working, each cell, by its action signal, controls the activity provided for in the phase corresponding thereto, the performance of which activity supplies an input signal to the next cell while, by one of its output signals, it cancels the previous cell's phase signal.

Preferably, moreover, the previous cell's phase signal constitutes an input signal for the enabling of the next cell. It is thus certain that the next cell in the order of sequence cannot be started if the previous one has not been started in its turn.

In this way and reciprocally, sequential working of an installation being put into some diagrammatic form, e.g., a synoptic table, a developed diagram, or a flowchart, it is possible to make a cell correspond to each phase of the sequence and to give material form, by aligned arrangement of these cells on the one hand and connecting them into a chain on the other hand, to the phase order in the sequence.

In this connection, each cell, in turn, controls the action or actions which are to be performed in the phase, it prepares the next cell for action and cancels the possible activity of the previous cell.

If, in addition, an indicator lamp is connected in each cell to the emission of each of the output signals (phase and action), the chain of cells forms a sort of synoptic table showing, by indicator lamps, the successive phases of the sequential working and, in case of a breakdown, the phase at which this occurred.

The conditions corresponding to the emission of the phase signal and the action signal can be written in the form of logical equations, the two connections of each cell can be given material form by logical connections using AND gates and OR gates and a flip-flop transistor connection to give material form to the store.

The cell input can consist of an AND gate which adds up the interlocking conditions. In particular, an input in each cell must receive a permanent automation signal to provide automatic working in sequence.

All the interlocking conditions being met, the sequential working thus starts up, from the phase where its movement had been stopped, when the automatic working signal is put in action.

It is possible and preferable to provide a plurality of inputs for various variables; if all these inputs are not used for different signals, one of the input signals governing working can be applied at the same time to all available inputs in order for the AND gate adding up the input conditions to receive the data necessary for its working, in sufficient quantity.

As will become evident further on, while the cell in accordance with the invention is particularly well suited to an electronic form, it can also be made with electromagnetic or pneumatic means. In its electronic version, it can be obtained by connecting discrete components or be made from integrated circuit elements. In the electronic version, its carrier is, in all cases, a printed circuit card.

The attached diagrams and the corresponding explanation will give a good understanding of how the invention can be embodied and put into operation.

FIG. 6 shows a sequential connection of cells.

FIG. 7 is a simplified diagram showing a bifurcate chain.

FIG. 8 is a detailed diagram of an installation.

Figures 1, 2:
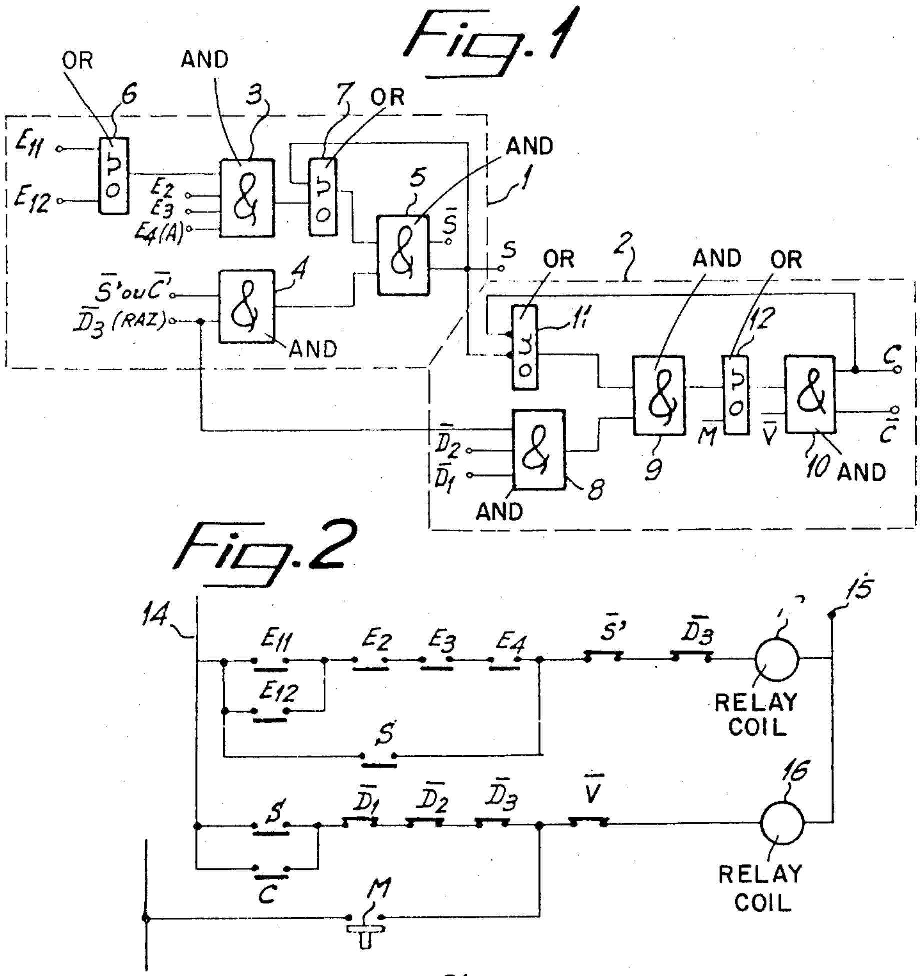
FIG. 1 is a logical diagram of a cell in accordance with the invention.
FIG. 2 is a developed electrical diagram.

The cell shown in FIG. 1 comprises two logical connections 1 and 2 arranged in cascade.

Connection 1, which supplies the phase signal (S) comprises three AND gates, 3, 4 and 5 representively, and two OR gates, 6, 7.

AND gate 3 receives the input signals $E_{11}$ and $E_{12}$ through OR gate 6 and, direct, signals $E_2$, $E_3$ and $E_4$. The signal $E_4$ input receives a permanent signal A for the automatic working of the connection. A second signal $E_3$ input can receive an enabling signal (S) as explained further on. The three remaining signal inputs $E_{11}$, $E_{12}$ and $E_2$ are designed to receive the control variables.

The second AND gate 4 receives the reverse signal logical complement of a disabling signal which is a return to zero signal (RZ) and a signal $\overline{S'}$ or $\overline{C'}$ which is the complement or logical "reverse signal" of one of the output signals produced by the next cell, i.e., either the phase signal S' or the action signal C'.

In the cell shown, the phase signal S and its reverse signal $\overline{S}$ are supplied by the AND gate 5 which receives the output signal from AND gate 4 and the output signal from AND gate 3 through OR gate 7 in which the signal S is reinjected, which provides the store for this signal when the input variables have disappeared.

The connection 1 thus ensures the supply of the signal S in accordance with the equation:

$$S = [(E_{11} + E_{12}) \cdot E_2 \cdot E_3 \cdot E_4 + S]\ \overline{S'} \cdot \overline{D_3}$$

In other words, the connection 1 supplies a signal $S$ if the following are simultaneously present:

the control signals $E_2$, $E_3$, $E_4$ and one of the two signals $E_{11}$ and $E_{12}$, the reverse signal of an output signal from the next cell, the reverse signal of the return to zero signal.

This signal S is held if one or several control signals disappear, but it is deleted either by the return to zero or by the next cell becoming active, i.e., the emission of one of its output signals.

The connection 2, which supplies the action signal (C), comprises the three AND gates 8, 9, 10 and the two OR gates 11 and 12.

AND gate 9 receives, on the one hand, the output signal from OR gate 11 receiving at its own inputs the signal S and the signal C and which thus forms a store for the latter and, on the other hand, the output signal from AND gate 8 receiving at the input the reverse signals $\overline{D_1}$, $\overline{D_2}$, $\overline{D_3}$ of the disabling signals.

With signal $D_3$ providing the return to zero, one of the other disabling signals, e.g., $D_1$, can be allotted to adjustment purposes, i.e., make it possible to stop the sequential working of a chain of cells at the one corresponding to a station in an installation where periodic adjustments are needed (e.g., a welding station or a drilling head). The other signal $D_2$ is the ordinary disabling signal supplied by a collector which has sensed the end of the in-service phase.

It will be noted that the AND gate of the reverse signals of the disabling signals can be replaced by a NOR gate receiving the corresponding direct signals.

The output signal from AND gate 9 is taken into OR gate 12 at the same time as a manual control signal M, while the output of OR gate 12 is connected to one of the inputs of AND gate 10, the other input of which receives the reverse signal $\overline{V}$ of a locking signal to produce the signal $C$.

The connection 2 thus supplies the signal $C$ in accordance with the logical equation:

$$C = [(S + C) \cdot \overline{D_1} \cdot \overline{D_2} \cdot \overline{D_3} + M] \cdot \overline{V}$$

In other words, the signal $C$ can only appear if there is no direct locking signal $V$; but it can be produced manually (M) even if the direct disabling signals $D_1$, $D_2$, $D_3$ are active. Finally, as long as these latter signals have not appeared, the signal $C$ is held even if the signal $S$ has disappeared.

The signal $C$, like signal $S$, is duplicated by its reverse signal $\overline{C}$. Signals C and $\overline{C}$ can be used, not only for the action control of which the collectors will then supply the disabling signals $E_{11}$, $E_{12}$, $E_2$ from a following cell, but as locking signals of a previous or following cell, especially when two operations is a sequence are incompatible.

FIG. 2 shows a developed electromechanical embodiment of a cell in accordance with the invention working in accordance with the same logical equations.

Between the bus-bars 14 and 15 a relay or contactor 13 is fitted, which is controlled by the chain of *n-o* contacts $E_{11}$ (or $E_{12}$), $E_2$, $E_3$, $E_4$ and the two *n-c* contacts S' and $D_3$. A contact S, controlled by the relay (or contactor) 13, shunts the chain $E_{11} \ldots E_4$ to provide the feedback to this relay 13 as well as the store.

Similarly, a relay or contactor 16 can be controlled by closing the contacts C or S and the chain of *n-c* contacts $\overline{D_1}$, $\overline{D_2}$, $\overline{D_3}$, $\overline{V}$. However, by means of the manual push-button M, all the contacts can be shunted, except the one bearing the reference $\overline{V}$, i.e., manual control is possible unless emergency locking is effected by the "variable" $\overline{V}$.

Figure 3:
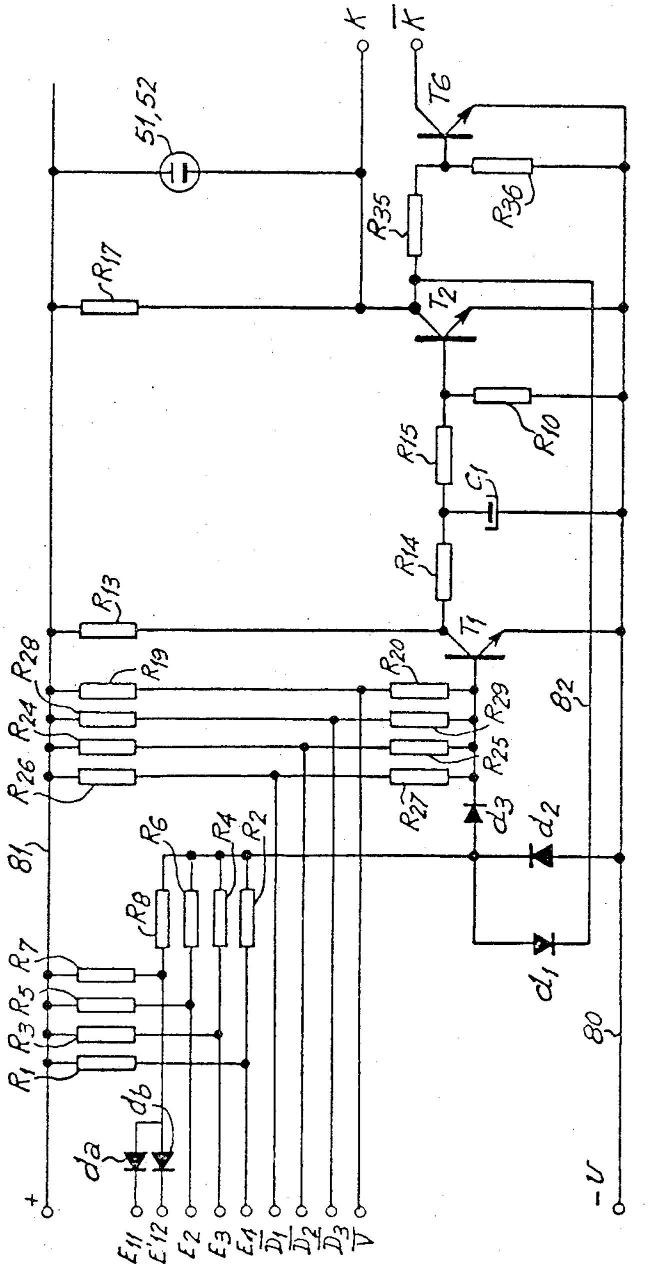
FIGS. 3 and 4 show, as examples, two electronic diagrams, one — simplified — showing the possibility of emitting a signal which is both a phase and an action signal, the other showing a cell in accordance with the invention derived from the simplified diagram.

FIG. 3 shows a diagram of a simplified electronic cell which can supply a single output signal $K$ and its reverse signal $\overline{K}$.

This cell works in accordance with the logical equation:

$$K = [(E_{11} + E_{12}) \cdot E_2 \cdot E_3 \cdot E_4 + K] \cdot \overline{D_1} \cdot \overline{D_2} \cdot \overline{D_3} \cdot \overline{V}$$

This cell basically comprises two flip-flop mounted transistors $T_1$ and $T_2$, a third reversing transistor referenced $T_6$ (to correspond to the cell shown in FIG. 4) and various components: resistors, diodes and condensers, whose function will be defined further on.

Let us assume that the feed is supplied by a double-alternating rectified current applied between the common conductor 80 to the negative potential (−U) and the conductor 81 (+).

The logical One level corresponds to −U and the logical Zero level to $|U/2|$ assuming that the pairs of resistors $R_1$, $R_2$; $R_3$, $R_4$; . . . $R_7$, $R_8$; $R_{19}$, $R_{20}$; $R_{24}$, $R_{25}$; $R_{26}$, $R_{27}$; $R_{28}$, $R_{29}$ consist of equal resistors.

For working purposes, by means of the collectors or various contacts, the inputs of signals $E_{11}$, $E_{12}$. . . $E_2$, $E_3$, $E_4$, $\overline{D}_1$, $\overline{D}_2$, $\overline{D}_3$, $\overline{V}$ can be changed to One level (−U) or remain at Zero level if these contacts remain open.

Due to the presence of the diode $d_3$, so long as all the signals $E_2$, $E_3$, $E_4$ are not at One level at the same time as one or other of the signals $E_{11}$ and $E_{12}$ (because of the OR gate formed by the diodes $d_a$ and $d_b$) the base of the transistor $T_1$ cannot become negative. It also remains positive if the signals $\overline{D_1}$, $\overline{D_2}$, $\overline{D_3}$ and $\overline{V}$ do not also acquire a −U value.

When all the signals $E_{11}$ or $E_{12}$, $E_2$ . . . $\overline{V}$ ending at the left-hand inputs in FIG. 3 have a −U value, the transistor $T_1$, which was passing, locks and, via $R_{13}$, $R_{14}$ and $R_{15}$, sends a positive voltage to the base of the transistor $T_2$, which is unlocked; it then supplies the signal K to the One level, lighting up the indicator lamp formed by the discharge lamp 51, 52 which then receives the (−U) voltage on one side and the + voltage on the other.

In this connection, the RC network, consisting of the resistors $R_{14}$, $R_{15}$ and the condenser $C_1$, delays the conduction of the transistor $T_2$ at the interlock by the time the charge of the condenser $C_1$ takes to go through said resistors.

Conversely, when the transistor $T_2$ ceases conducting, as explained further on, the condenser discharges through the base diode-emitter of the transistor $T_2$ and through the transistor $T_1$ which is still conducting, so that the starting movement is also delayed.

This timing at the interlock and the start of the signal appearing at output K protects the connection from interference reaching the inputs, especially that due to contact faults (surge, defective condition).

The condenser $C_1$ also makes it possible to hold the memory of the conduction of transistor $T_2$ when, as has been assumed, the feed voltage consists of a rectified alternating current.

When the transistor $T_2$ is locked (signal K at Zero level), the transistor $T_6$ is conductive; it locks in turn when the transistor $T_2$ becomes passing due to the fact that the resistors $R_{35}$ and $R_{36}$ then transmit the (−U) voltage from the collector of this transistor $T_6$. Thus, as soon as the signal K, which was at Zero level, goes to One level, the reverse signal K goes to Zero level and vice versa.

When one of the signals $\overline{D}_1$, $\overline{D}_2$, $\overline{D}_3$ or $\overline{V}$ ceases to have a One value, a positive voltage is transmitted directly to the base of the transistor $T_1$ and this starts passing again. The flip-flop then resumes the "at rest" condition.

However, the (−U) voltage of the collector of the transistor $T_2$ in the passing state being returned to the level of the anode of the diode $d_3$ by the conductor 82 and the diode $d_1$, the return passage of one of the input signals $E_{11}$ (or $E_{12}$), $E_2$, $E_3$, $E_4$ from One condition to Zero condition has no effect on the conduction of the transistor $T_1$ as the anode of the diode $d_3$ is kept negative enough not to transmit the positive signal coming from the change of level of one of these inputs.

Finally, in the connection, the diode $d_2$, connected to the diode $d_3$, shunts any current fluctuations which are more negative than $-U$ which might appear on the base of the transistor $T_1$, to the common conductor.

Figure 4:
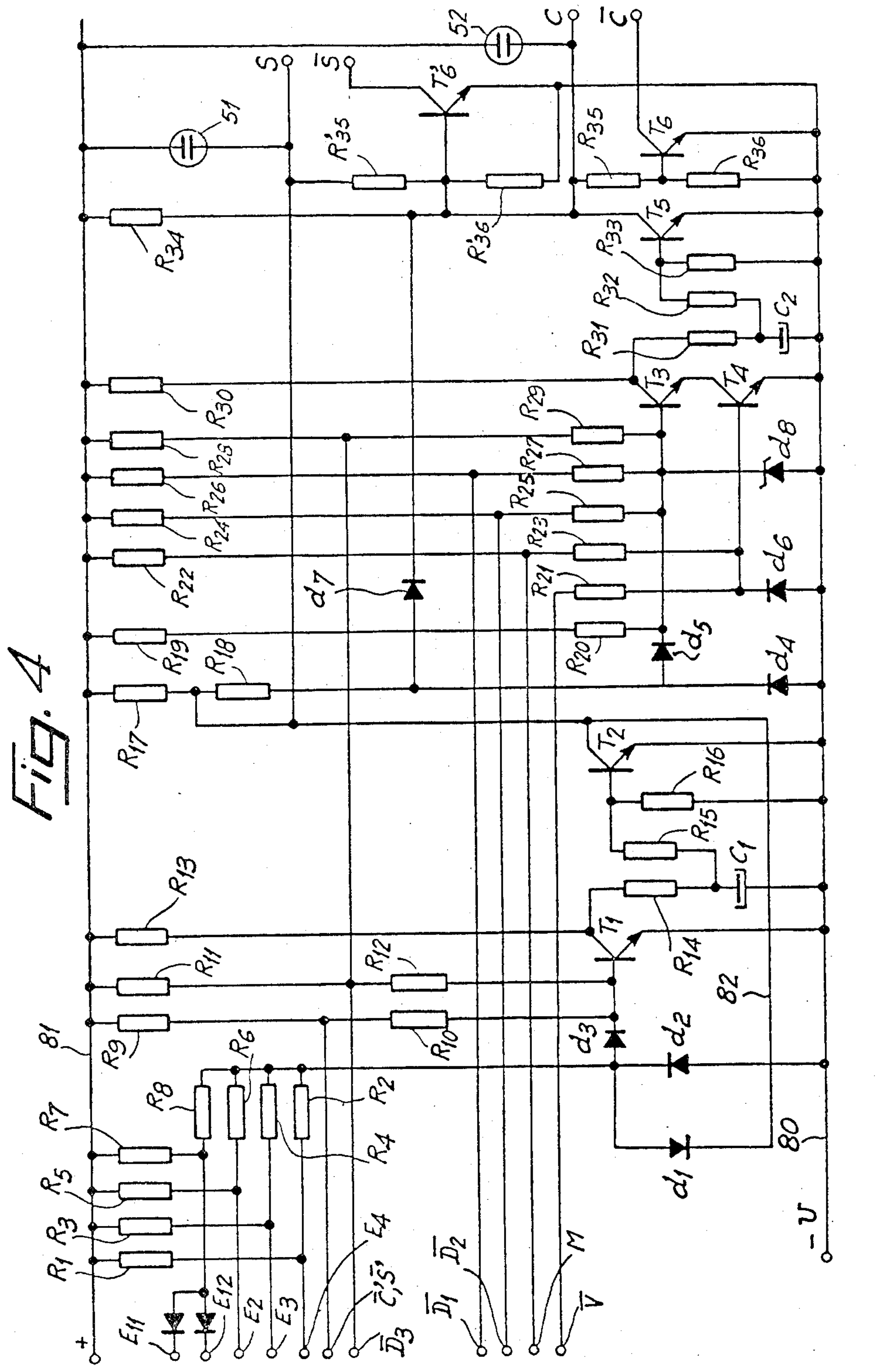

FIG. 4 shows a form of embodiment of a complete cell in accordance with the invention.

In this embodiment, to supply the two signals S and C the cell comprises two flip-flops, consisting respectively of the transistors $T_1$ and $T_2$ on the one hand, and the pair of transistors $T_3$, $T_4$ and the output transistor $T_5$ on the other hand.

Moreover, two reversing transistors $T_6$ and $T'_6$ designed to supply the signals S and C have been shown. In practice, it is enough to equip the cell with a single reversing transistor and provide for a mobile connection making it possible to connect it, either to the output of signal S or to the output of signal C. The discharge lamps 51 and 52 respectively, constituting the indicator lamps, are mounted on these outputs.

The flip-flop $T_1$, $T_2$ works as has already been explained in relation to FIG. 3. Nevertheless, the conductors bringing, via the set of resistors $R_9$, $R_{10}$ and $R_{11}$, $R_{12}$, the signals $\overline{D}_3$ (general return to zero) and $\overline{C}'$ (or $\overline{S}'$), in other words one of the two output signals of the next complete cell in the chain of cells, end between the diode $d_3$ and the base of the transistor $T_1$.

When the flip-flop $T_1$, $T_2$ supplies the signal S to the One level, the interlocking of the output C corresponding to tht passage of the transistor $T_5$ from the locked state to the conductive state (cf. $T_2$ — FIG. 3) is brought about by the locking of one of the transistors $T_3$ or $T_4$ or both of them, these transistors being passing in the "at rest" state.

The locking of the transistor $T_3$ is obtained when, the inputs $\overline{D}_1$, $\overline{D}_2$, $\overline{D}_3$ being at One level, the collector of transistor $T_2$ (output S) is also at One level. The reverse-polarised diode $d_5$ prevents a positive potential reaching the base of the transistor $T_3$.

On its side, the transistor $T_4$ is locked if One level is applied to the base of this transistor $T_4$ both by the signal $\overline{V}$ and by the signal M through the resistors $R_{21}$ and $R_{23}$ respectively.

The signal $\overline{V}$ is also applied to the transistor $T_3$ by the resistor $R_{20}$.

In the absence of signals at One level, the transistors $T_3$ and $T_4$ which have the common charge resistor $R_{30}$, are kept conductive by the voltages which arrive via the resistor bridges $R_{19}$, $R_{20}$; $R_{24}$, $R_{25}$; $R_{26}$, $R_{27}$; $R_{28}$, $R_{29}$ for the transistor $T_3$ and $R_{20}$, $R_{21}$ and $R_{22}$, $R_{23}$ for the transistor $T_4$.

When at least one of the transistors $T_3$ and $T_4$ is locked, the transistor $T_5$ becomes conductive, the interlocking and starting of the flip-flop so formed being, for the same reason as in the case of the flip-flop $T_1$, $T_2$, delayed by the RC network formed by the resistors $R_{30}$, $R_{31}$, $R_{32}$, $R_{33}$ and the condenser $C_2$.

When the transistor $T_5$ is conductive, its state and that (locked) of the transistors $T_3$ and $T_4$ are not changed by the return of the signal S to Zero level.

In fact, if the transistor $T_2$ locks, the current going through the resistors $R_{17}$ and $R_{18}$ is shunted by the diode $d_7$ and the transistor $T_5$ itself. The potential of the anode of the diode $d_7$ is thus very close to $-U$, it prevents the conduction of the diode $d_5$ (and of that formed by the base and the emitter of the transistor $T_3$), so that the transistor $T_3$ remains locked.

Thus, so long as the inputs of signals $\overline{D}_1$, $\overline{D}_2$, $\overline{D}_3$ and $\overline{V}$ remain at One level, the transistor $T_3$ remains locked and the signal C also remains supplied at One level. In this condition, the transistor $T_4$, although not conducting between its collector and its emitter, is conductive as the input of the M signal is at Zero level.

If one of the input signals $\overline{D}_1$, $\overline{D}_2$, $\overline{D}_3$ or $\overline{V}$ goes to Zero level, the transistor $T_3$ starts conducting again and, as transistor $T_4$ is already normally conductive, the potential of the collector of the transistor $T_3$ assumes a ($-U$) value, locking the transistor $T_5$. The output C is then at Zero level.

When the transistor $T_5$ is locked due to the fact that transistors $T_3$ and $T_4$ are both conductive and if the input of the signal $\overline{V}$ is at One level, by changing the input M to One level the transistor $T_4$ is locked, which makes the transistor $T_5$ passing. The signal C goes to One level.

If the input of the signal $\overline{V}$ is positive, the two transistors $T_3$, $T_4$ are kept conductive and the transistor $T_5$ cannot become conductive, i.e., the action signal cannot be emitted.

In the connection shown, the diodes $d_4$ and $d_6$ play the same protective role against negative surges on the bases of the transistors $T_3$ and $T_4$ as diode $d_2$ does in the case of transistor $T_1$, as has already been explained.

Finally, the Zener diode $d_8$ protects the junction between the emitter and the base of the transistor $T_3$ against positive surges which may appear via the base-collector junction of transistor $T_4$.

Figure 5:
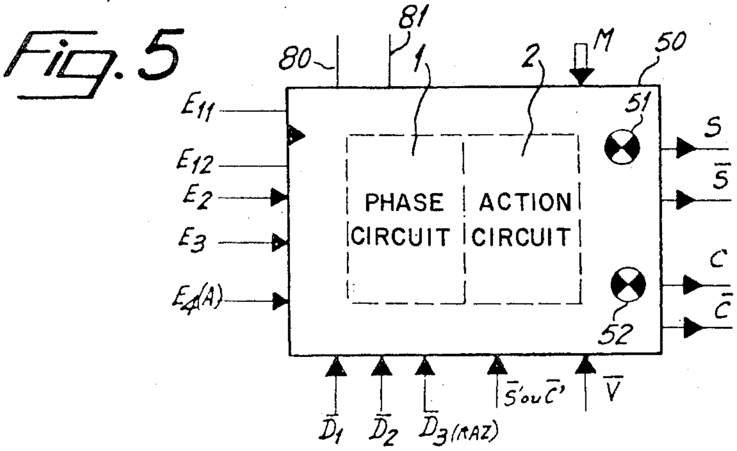
FIG. 5 is a simplified diagrammatical representation of a cell in accordance with the invention.

A cell in accordance with the invention, in its electronic embodiment, can be mounted on a printed circuit card and incorporated (FIG. 5) in a box 50 comprising, on one face, the input terminals $E_{11}$, $E_{12}$, $E_3$, $E_4$ and, on the opposite face, the output terminals S and S; as C and C respectively correspond to the indicator lamps 51 and 52, as has been explained, these light up when S and C respectively are active.

On an accessible face, the box comprises the push-button M and, finally, on another face, the disabling terminals $\overline{D}_1$, $\overline{D}_2$, $\overline{D}_3$ and the inhibiting and lockout terminals $\overline{C}'$ or $\overline{S}'$ and $\overline{V}$ respectively. The terminals 80 and 81 enable these to be fed.

In FIG. 6, three cells of this kind $50_{n-1}$, $50_n$, $50_{n+1}$ are chain mounted; they correspond to a portion of a sequential automatic system. These three cells are similar to the one shown in FIG. 5, therefore, in order not to crowd the drawing, their various terminals bear no references and only the connecting conductors are referenced.

Thus, from cell $50_{n-1}$, via the conductor 53, an enabling signal (S) is sent to cell $50_n$, while via the conductor 54, a signal $\overline{S}$ (or $\overline{C}$) stopping the phase signal is sent to the previous cell (not shown).

The conductors $53_1$ and $54_1$, $53_2$ and $54_2$ serve the same function for the following cells, the conductors $53_1$ and $53_2$ being, as an example, connected to the outputs $\overline{C}$.

The conductor 55 (signal C) through the amplifier 56 and possibly a power contactor (not shown) act on the control component 57, the latter's action being sensed by a collector 58.

This can be one of the many components known in the art which are capable of all or nothing electrical control, e.g., by throwing a contact, when contact, a thermostat, a manostat, a magnetic passage sensor with Reed contacts, etc.

At rest, the collector 58 can supply a voltage which can be used either to hold the start of the next cell (conductor 59) or to lock it (conductor 60 shown in a dotted line), thereby preventing even its manual operation. At the end of the action of the power component 57, the collector supplies, via the conductor 61, a signal interlocking cell $50_n$ which, in the absence of other interlocking signals, is applied to all available inputs of that cell.

When this is working, it in turn similarly controls the next cell $50_{n+1}$, via the conductor $55_1$ and the cascade $56_1$, $57_1$, $58_1$ with return via the conductor $61_1$.

This action may be precisely the reverse of the previous one, in the case e.g., of a to-and-fro movement.

FIG. 6 also shows:

the line 62 which, connected to the various terminals $E_4$, makes these permanently live at One level for automatic working of the sequence, the line 63 which connects the various terminals $D_3$ via a switch for the general return to zero of the control device, the line 64 connected to some of the cells (e.g., $50_n$, via the signal $D_1$ input) to send a Zero level starting voltage into these cells corresponding to certain phases, this in order to stop the automatic working at these cells to enable adjustments to be made.

Finally, a line 65 can be used to feed current to those of the buttons M it may be desired to use, e.g., that of cell $50_n$ (e.g., manual control for adjustment).

Lines 62 , 64 and 65 can be connected to a rotary switch (not shown) enabling some of them to be made live while preventing the simultaneous feed to some others.

For safety's sake (FIG. 8), the voltages ($V_1$, $V_2$. . . $V_n$) corresponding to emergency lock-outs, can be brought back to a cell 67, e.g., as shown in FIG. 3, which enables these lock-outs to be taken into account either in joint combination or in alternate combination.

Via the amplifier 68, the output of this cell feeds a contactor coil 69, passing through the parallel mounting of a contact for feeding back to this contactor and a push-button 70. This main contact (not shown) of this contactor is in series in the feed through said rotary switch feeding lines 62, 64, 65.

Thus, in case of an emergency lock-out, the coil of the contactor 69 is de-excited and can only be put back into service by pressing on the pushbutton 70.

FIG. 7 shows how, with cells in accordance with the invention, not only linear chains but also bifurcated chains can be formed.

Cell $50_p$ enables, by its signal S, through the bifurcate conductor 70, the cells 50A and 50B. The one of these two cells which becomes operative is the one which, in addition, receives a direct signal coming respectively from the conductor 71 or the conductor 72, each of these conductors moreover feeding a disabling input $\overline{D_2}$ of the other cell.

Thus, only that one of the two cells 50A or 50B which receives an interlocking signal and no disabling signal becomes active.

As no action occurs between cells $50_p$ and $50_A$ or $50_B$ other than the choice of one of the latter, the signal $\overline{S'}$ can be used to cut out the phase signal of cell $50_p$.

The sequence continues in this way, either through channel 50A . . . 50C or through channel 50B . . . 50D.

As shown by lines 73 and 74 respectively, all the cells in one of the channels can be locked by the action signal of the first chain of the other.

The last cells 50C and 50D respectively control the actions allocated to them, as shown diagrammatically by the outlines 75 and 76. The signals supplied by the two collectors included in these actions are directed simultaneously towards the appropriate input of cell $50_q$ which marks the end of the bifurcation.

In a general way, in sequential automation, the signal $\overline{S'}$ can be used to cut out the phase signal of the previous cell when the latter does not control any action, while the signal $\overline{C'}$ is brought into play whenever a cell controls an action, so that the preceding phase signal shall only be cut out if the action of the next phase has been started.

Of course, the chains of sequential automation cells can be closed on themselves and connected to adding or deducting meters, so as to record the number of operations carried out at any point in a chain where it may be necessary.

The invention is applicable to all sequential automation systems, irrespective of their electric, electronic or pneumatic form of control, on machines or in plant, or even complete factory chains.

Instead of using the logical equation given with reference to FIG. 1 for the signal *S*, the following equation can be used:

$$S = [(E_2 \cdot E_3 \cdot E_4) + S + A]\overline{S'} \cdot \overline{D_3} \cdot \overline{D_4}$$

Figure 9:
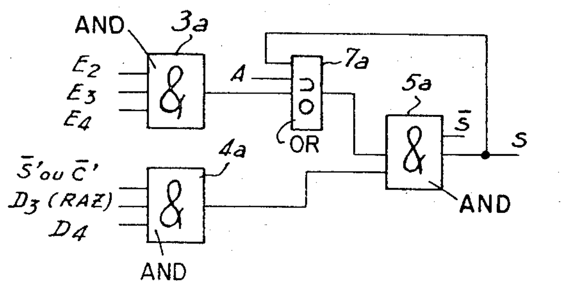
FIG. 9 shows a variation of the "phase" connection of the cell in FIG. 1.
Figure 10:
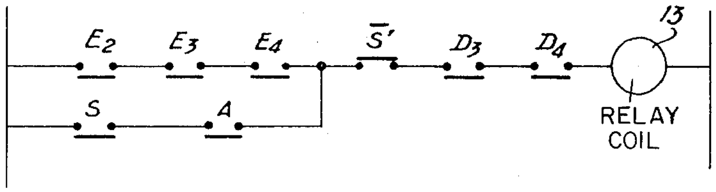
FIG. 10 is a developed electrical diagram of the "phase" connection in FIG. 9.

This result is obtained by means of the logical diagram in FIG. 9, from which the gate 6 in the figure has been eliminated. The input signal $E_4$ of AND gate 3*a* then fulfils the function of this gate 6 and the permanent signal A is applied to the terminal A of OR gate 7*a*. AND gate 4*a*, like its homologue 4 in FIG. 1, receives the signal $\overline{S'}$ or $\overline{C'}$ but the return to zero (RZ) is effected by the direct $D_3$, which is still a cell disabling signal. Moreover, the signal $D_3$ has been duplicated by a signal $D_4$. This phase connection is simpler than the corresponding connection in FIG. 1. FIG. 10 shows it embodied by means of relays.

Similarly, instead of using the equation given with reference to FIG. 1 for the signal *C*, the following equation can be used:

$$C = [(S_1 + S_2 + S_3 + C)\ \overline{S'} + M]D_1 \cdot V$$

Figure 11:
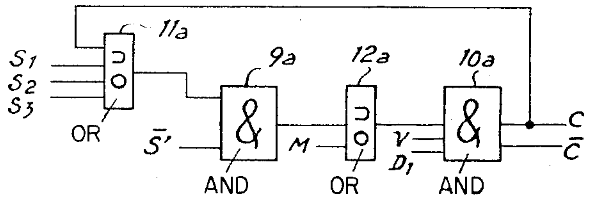
FIG. 11 shows a variation of the "action" connection of the cell in FIG. 1.
Figure 12:
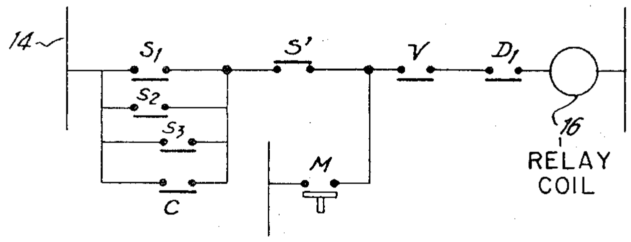
FIG. 12 is a developed electrical diagram of the "action" connection in FIG. 11.

This result is obtained by means of the logical diagram of FIG. 11. OR gate 11*a*, besides the input C, has three inputs $S_1$, $S_2$, $S_3$. In other words, three cells can be parallel connected thereto. The action will thus be exercised on several phases $S_1$, $S_2$, $S_3$, consecutive or otherwise. A single signal S' is used instead of the signals $\overline{D_1}$, $\overline{D_2}$, $\overline{D_3}$ so that the gate 8 in the connection in FIG. 1 can be eliminated, the signal $\overline{S'}$ being applied to a gate 9*a* input. In addition to the output from 12*a*, the gate 10*a* receives the direct signal V and a starting signal $D_1$. This action connection is simpler than the corresponding connection in FIG. 1 and provides more possibilities. FIG. 12 illustrates it embodied by means of relays.

We claim:

1. In a system for asynchronous automation control, comprising a plurality of phase signal generating circuits for determining, in a sequence of automatic actions, when certain actions will be effected and of action signal generating circuits for starting the performance of said actions, in which each phase signal generating circuit has at least one output on which it provides a logic phase signal when activated by simultaneous input signals and comprises means for storing and disabling said logic phase signal, whereas each action signal generating circuit provides an action signal, the improvement in which each action signal generating circuit comprises a first OR gate having an input connected to at least one output of a phase signal generating circuit, said first OR gate having a further input and an output; a first AND gate having an input connected to the first OR gate output and a further input, said first AND gate having an output; a second OR gate having an input connected to the first AND gate output and a further input, said second OR gate having an output; and a second AND gate having an input connected to the second OR gate output, a further input and an output connected to said first OR gate further input.

2. In a system according to claim 1, the improvement in which each phase signal generating circuit comprises a first AND gate having a plurality of inputs for receiving said simultaneous input signals, said first AND gate having an output; a first OR gate having an input connected to the first AND gate output, said first OR gate having a further input and an output; a second AND gate having an input connected to the first OR gate output, at least one further input, and an output delivering said phase signal, and means connecting the output of the second AND gate to said first OR gate further input.

3. In a system according to claim 2, the improvement in which each phase signal generating circuit comprises a first AND gate having a plurality of inputs for receiving said simultaneous input signals, said first AND gate having an output; a second AND gate having an input, a further input and an output; an OR gate having an output connected to the first AND gate output and a further input connected to the second AND gate output, said OR gate having an output; and a third AND gate having an input connected to the OR gate output, at least one further input, and an output delivering said phase signal and means connecting the output of the third AND gate to said OR gate further input.

4. A system according to claim 2, characterized in that the phase signal generating circuit comprising a second OR gate having a plurality of inputs and an output connected to one said first AND gate input.

5. A system according to claim 1, characterized in that the action signal generating circuit comprises a third AND gate having a plurality of inputs and an output connected to said first AND gate further input.

6. A system according to claim 1, characterized in that each phase signal generating circuit comprises two outputs respectively delivering a phase signal and its logical complement.

7. A system according to claim 1, characterized in that said second AND gate has a further output, the output and the further output of said second AND gate respectively delivering an action signal and its logical complement.

* * * * *